US012195042B2

(12) United States Patent
Carr et al.

(10) Patent No.: US 12,195,042 B2
(45) Date of Patent: Jan. 14, 2025

(54) VALIDATING PROTOLANES WITH ACTOR BEHAVIOR FLOWCHARTS

(71) Applicant: FORD GLOBAL TECHNOLOGIES, LLC, Dearborn, MI (US)

(72) Inventors: George Peter Kenneth Carr, Allison Park, PA (US); Shawn Cook, Dearborn, MI (US); Brett Browning, Pittsburgh, PA (US); Andrew Hartnett, West Hartford, CT (US); Constantin A. Savtchenko, Sewickley, PA (US); Neal Seegmiller, Pittsburgh, PA (US); Christopher Cunningham, Pittsburgh, PA (US); Thomas Mark Petroff, Gibsonia, PA (US); Michael Pacilio, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 17/846,652

(22) Filed: Jun. 22, 2022

(65) Prior Publication Data
US 2023/0415773 A1 Dec. 28, 2023

(51) Int. Cl.
*B60W 60/00* (2020.01)
(52) U.S. Cl.
CPC ..... *B60W 60/0011* (2020.02); *B60W 2552/10* (2020.02); *B60W 2552/53* (2020.02)
(58) Field of Classification Search
CPC ........ B60W 60/0011; B60W 2552/10; B60W 2552/53; B60W 2420/403; B60W 2554/4045; B60W 2554/4046; B60W 60/001; B60W 60/0027; B60W 30/0956; G08G 1/0967; G08G 1/096708; G08G 1/166
See application file for complete search history.

(56) References Cited

U.S. PATENT DOCUMENTS

| 2019/0243372 A1* | 8/2019 | Huval | G05D 1/0221 |
| 2021/0101619 A1* | 4/2021 | Weast | G06F 16/2457 |
| 2021/0261126 A1* | 8/2021 | Karamanov | G06F 18/2415 |
| 2022/0126831 A1* | 4/2022 | Foil | G08G 1/16 |
| 2023/0415767 A1* | 12/2023 | Carr | B60W 30/0956 |

* cited by examiner

Primary Examiner — Samir A Ahmed
(74) Attorney, Agent, or Firm — Frank A. MacKenzie; Brooks Kushman P.C.

(57) ABSTRACT

Disclosed herein are system, method, and computer program product aspects for validating protolanes. For example, the method includes determining a protolane level flowchart from one or more flowcharts corresponding to one or more gates of a protolane selected from a set of protolanes of a geonet, wherein the one or more flowcharts correspond to conditions that can be encountered by an actor approaching the corresponding one or more gates, and wherein the geonet comprises a plurality of lane segments associated with the set of protolanes. A graph through the protolane level flowchart is generated that corresponds to actions of an actor. Reasoning of the actor is validated by testing the actions of the actor against the graph through the protolane level flowchart.

20 Claims, 13 Drawing Sheets

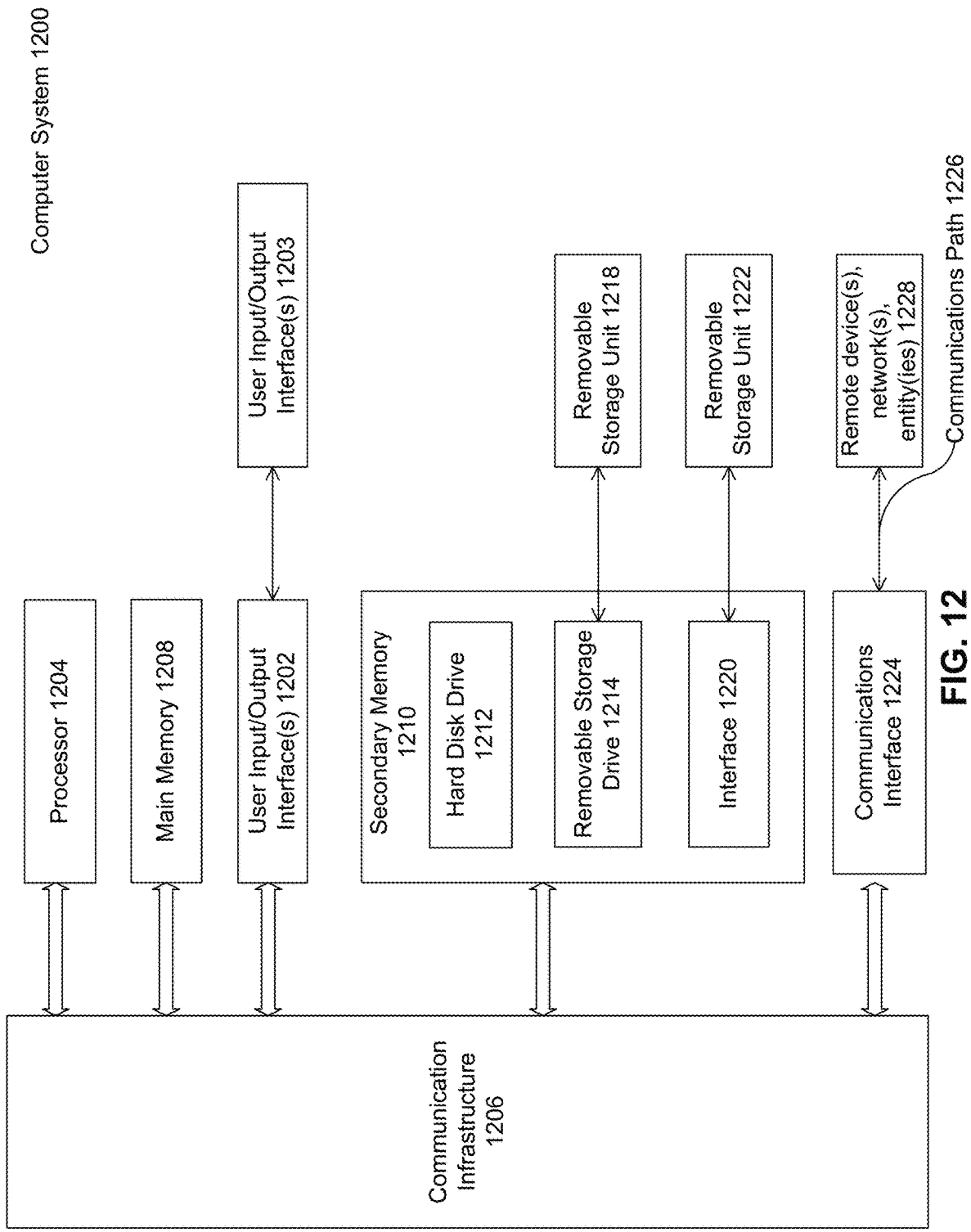

VALIDATING PROTOLANES WITH ACTOR BEHAVIOR FLOWCHARTS

CROSS-REFERENCE TO RELATED APPLICATIONS

This application is related to U.S. patent application Ser. No. 17/846,641, entitled "PROTOLANES FOR TESTING AUTONOMOUS VEHICLE INTENT" to Carr et al., filed herewith, which is incorporated by reference herein in its entirety. This application is also related to U.S. patent application Ser. No. 17/846,656, entitled "TESTING REUSE ACROSS PROTOLANE FAMILIES" to Carr et al., filed herewith, which is incorporated by reference herein in its entirety. This application is further related to U.S. patent application Ser. No. 17/846,630, entitled "LANE SEGMENT CLUSTERING USING HYBRID DISTANCE METRICS" to Hartnett et al., filed herewith, which is incorporated by reference herein in its entirety.

BACKGROUND

With the advent of autonomous vehicle technologies have come increased concerns about their abilities, especially compared to manual control by a human operator. With a human operator in control of a vehicle, it is possible for the operator to adapt on-the-fly in order to successfully navigate through any of a large number of scenarios that may arise over the course of driving.

Autonomous vehicles obtain information about their surroundings using a variety of sensors (such as optical, radar, and lidar sensors) in order to construct an understanding of the world around them. Using this information, in conjunction with other information made available to vehicle systems ahead of time, it is possible for the vehicle to make decisions that would similarly allow for successful navigation through any of a large number of scenarios that may arise.

The potential for reliable operation of such autonomous vehicle systems has been demonstrated through extensive real world use. As conditions change for the operation of autonomous vehicles, ensuring the trustworthiness of these autonomous vehicle systems becomes critical to adoption. The public, consumers, governments, and other stakeholders have an interest in ensuring that the autonomous vehicle will operate reliably under virtually all possible circumstances, even without any possibility for operator intervention in more complex situations and environments.

Accordingly, what is needed are techniques to provide evidence of the reliable operation of autonomous vehicles.

SUMMARY

Disclosed herein, in accordance with aspects, are systems, methods, and computer program products for determining a protolane level flowchart from one or more flowcharts corresponding to one or more gates of a protolane selected from a set of protolanes of a geonet, wherein the one or more flowcharts correspond to conditions that can be encountered by an actor approaching the corresponding one or more gates, and wherein the geonet comprises a plurality of lane segments associated with the set of protolanes. A graph through the protolane level flowchart is generated that corresponds to actions of an actor. Reasoning of the actor is validated by testing the actions of the actor against the graph through the protolane level flowchart.

BRIEF DESCRIPTION OF THE DRAWINGS

The accompanying drawings are incorporated herein and form a part of the specification.

FIG. 12 is an example computer system useful for implementing various aspects of the disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product aspects, and/or combinations and sub-combinations thereof, for testing autonomous vehicle (or "AV") systems. In particular, the approaches disclosed herein relate to identifying unique decision points in the AV's operational design domain (ODD) and validating the ability of the AV to make reliable decisions at those decision points. Using these approaches, it is possible to simplify the evaluation and proof of the correctness of the AV's operation over the extent of the ODD.

As used herein, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An autonomous vehicle is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Figure 1:
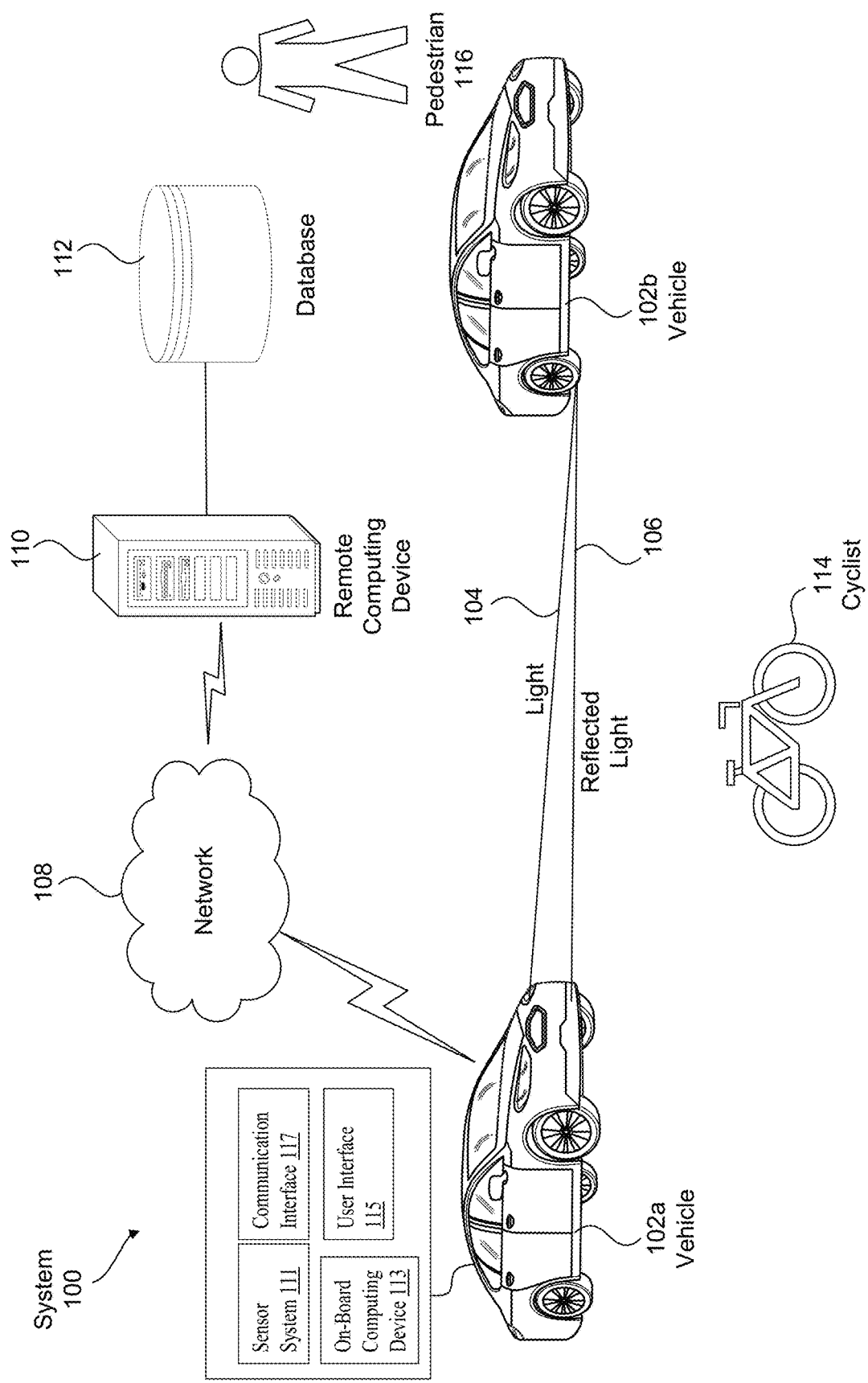
FIG. 1 illustrates an exemplary autonomous vehicle system, in accordance with aspects of the disclosure.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
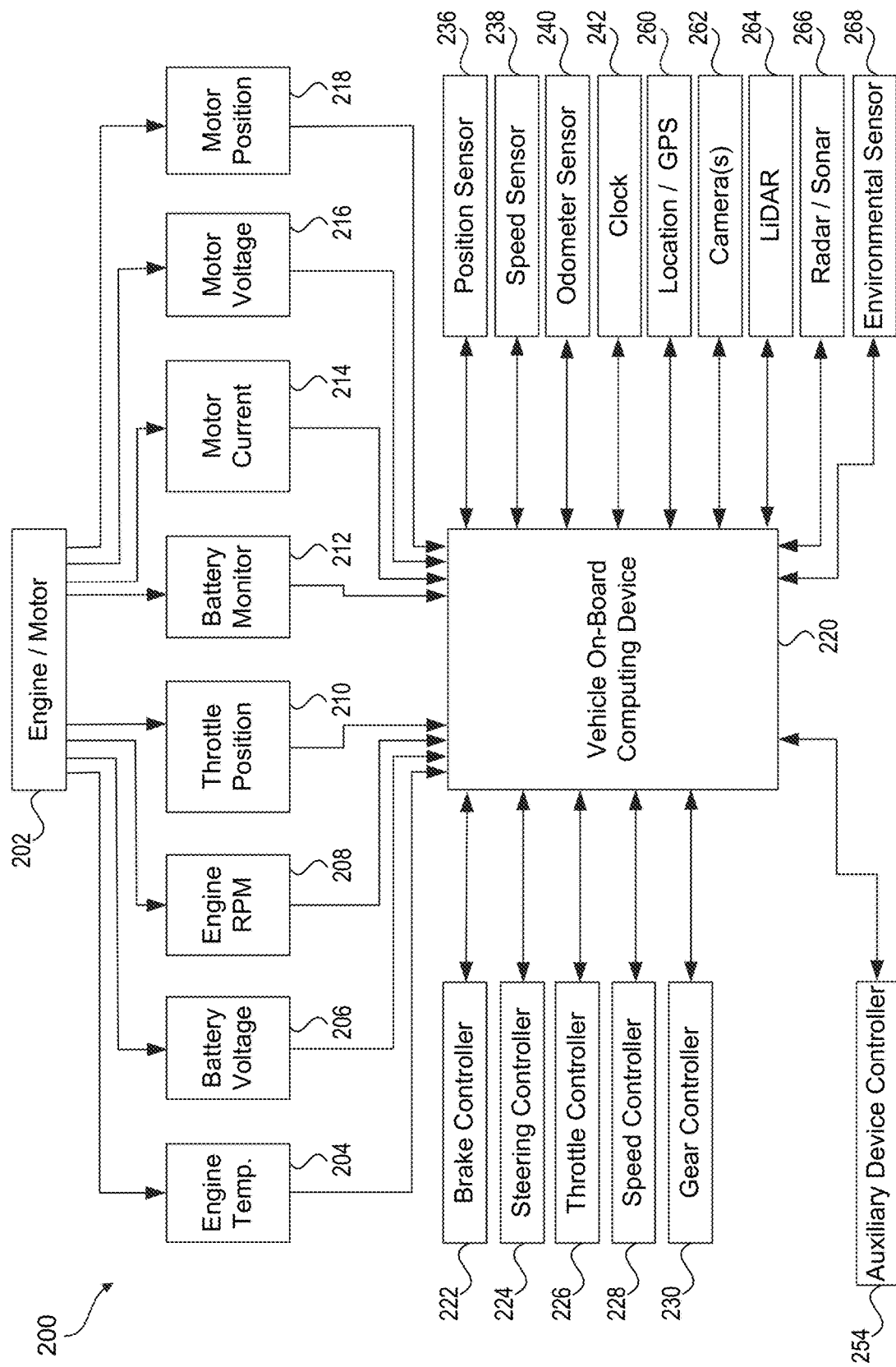
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

The AV 102a may also communicate data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 12. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the aspects disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various aspects, the on-board computing device 220 may determine perception information of the surrounding environment of the AV 102*a*. Based on the sensor data provided by one or more sensors and location information that is obtained, the on-board computing device 220 may determine perception information of the surrounding environment of the AV 102*a*. The perception information may represent what an ordinary driver would perceive in the surrounding environment of a vehicle. The perception data may include information relating to one or more objects in the environment of the AV 102*a*. For example, the on-board computing device 220 may process sensor data (e.g., lidar or RADAR data, camera images, etc.) in order to identify objects and/or features in the environment of AV 102*a*. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some aspects, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102*a*, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various aspects, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102*a* that best navigates the autonomous vehicle relative to the objects at their future locations.

In some aspects, the on-board computing device 220 may receive predictions and make a decision regarding how to handle objects and/or actors in the environment of the AV 102*a*. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. In an aspect, the on-board computing device 220 plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the possibility of a collision between a detected object and the AV 102a. If the possibility exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Exemplary autonomous vehicle system 100 of FIG. 1 and exemplary system architecture 200 of FIG. 2 together illustrate the complexity of the operation of autonomous vehicles. Beyond that, changes in the operating environment of the vehicle, including encountering unknown or unexpected situations, further complicate the problem. Ultimately, the space of variation in the testing and verification of autonomous vehicle systems is significantly larger than most other systems.

In approaching testing of such a large-scale system facing an unpredictable number of situations, it is useful to break down the problem into more manageable, testable components. For example, variations in the environment can be captured as separate unique dimensions, variations in vehicle behaviors can be captured as AV intents, and variations in behaviors of other actors can be captured in actor ontologies.

In order to capture variations in roadways or other pathways driven by an AV, the concept of a protolane is introduced. Protolanes allow the decomposition of the space of roadways driven by an AV based on variations in roadway segments. This allows simplification of roadways into individual segments that can be matched to a corresponding protolane.

Depending on the manner in which protolanes are developed, segments of roadways that have variations, but nevertheless share the same set of test cases, can be assigned to a same protolane or sequence of protolanes. Then, by testing and verifying the operation of the AV across possible scenarios for that protolane, by extension the AV has been tested and verified across all roadway segments assigned to that protolane.

By way of non-limiting example, an AV can be deployed to drive around roadways corresponding to a geonet. In this context, a geonet is used to refer to a collection of lane segments within a map (which may or may not ultimately be used by the AV to make driving decisions). The actual or simulated behavior of the AV at various segments can be verified against the appropriate behaviors for corresponding protolanes for each segment during testing.

Protolanes are the vocabulary used to describe the underlying roadways that can be navigated by an AV. The approaches disclosed herein provide an understanding of how to design protolanes, as well as their use in specific applications for testing and verification, by way of non-limiting example. These uses are separate from any decision-making processes within the AV itself In effect, this concept provides at least two specific benefits. For one, it allows for analogizing testing and verification results from one geonet to another geonet. Additionally, it ensures adequate test coverage for a given geonet.

Figure 3:
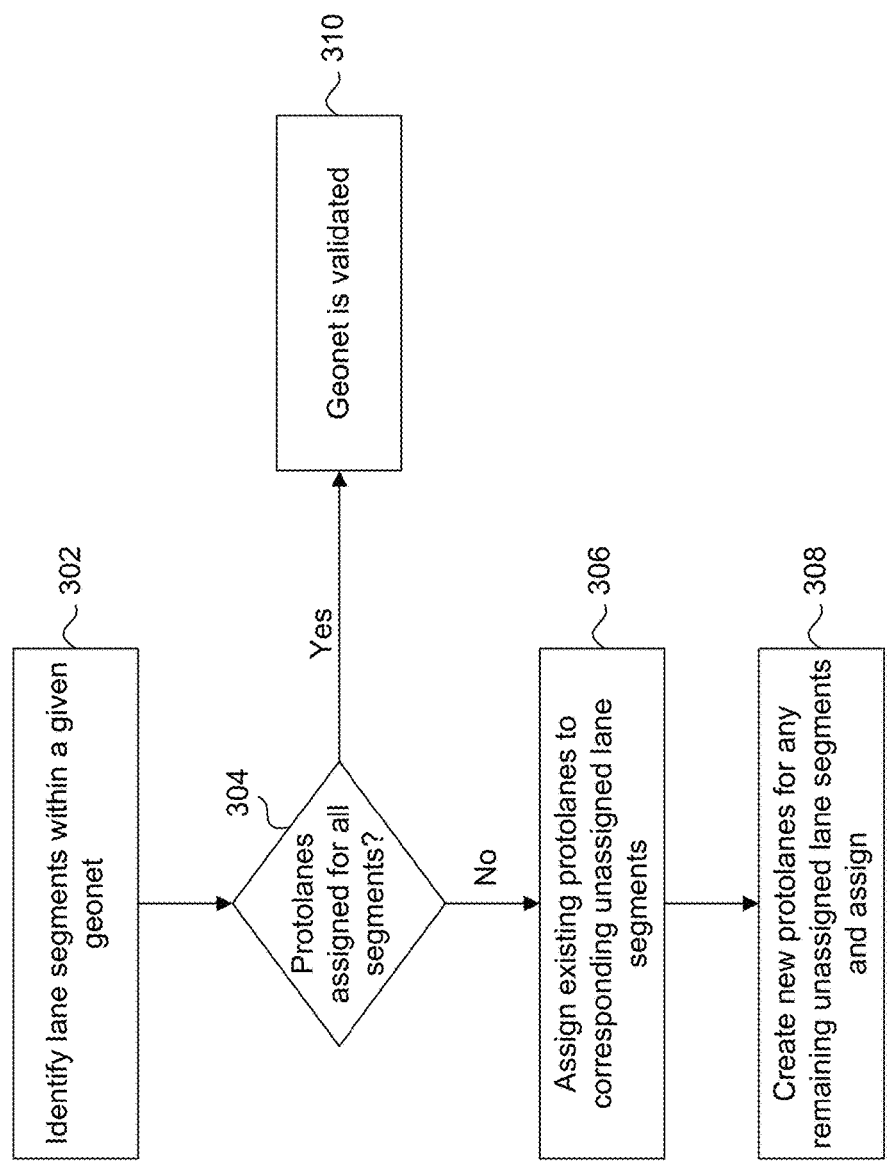
FIG. 3 is a flowchart illustrating steps by which protolanes can be assigned to lane segments within a geonet, in accordance with aspects of the disclosure.

FIG. 3 is a flowchart 300 illustrating steps by which protolanes can be assigned to lane segments within a geonet, in accordance with aspects of the disclosure. Beginning at step 302, lane segments within a given geonet are identified.

By way of non-limiting example, this geonet may be approached from a clean slate, for which protolanes would need to be created and associated with the lane segments. Or the geonet may have lane segments that have corresponding features to match existing protolanes, yet may require creating new protolanes for any lane segments that do not have a match among the existing protolanes.

At step 304, a determination is made whether protolanes have been assigned to all of the lane segments of the geonet. If so, then the geonet is validated at step 310, based on the assumption that behaviors around the protolanes have all been tested and verified.

Rather than attempting to test for every single scenario that the AV may possibly encounter in the real world, the test space can be simplified by restricting it to lane segments and scenarios that actually occur within the geonet. For example, if there are no lane segments that cross a railroad track within the geonet, then it is not important to test operation of the AV at railroad crossings in order to ensure reliable operation of the AV within the confines of the geonet.

If all of the lane segments of the geonet have been assigned to a corresponding protolane, then the flowchart proceeds to step 310 where the complete geonet is validated, by virtue of the underlying protolanes having been validated.

If any lane segments remain unassigned to a corresponding protolane, then those lane segments are assessed for a match against an existing protolane, and assigned that protolane in the event of a match at step 306. If any lane segments still remain unassigned, then new protolanes can be defined at step 308 for assignment to those lane segments, at which point the flow chart proceeds to step 310 as the geonet is validated.

The test space can be further reduced by limiting the lane segments within a geonet that are assessed and mapped to protolanes. While step 304 is described in the context of assessing all lane segments within a geonet for assignment to corresponding protolanes, it may be possible to determine whether a route or set of routes needed for navigation by an AV within a certain area can be completed using a subset of lane segments that correspond to a limited set of protolanes.

Figure 4:
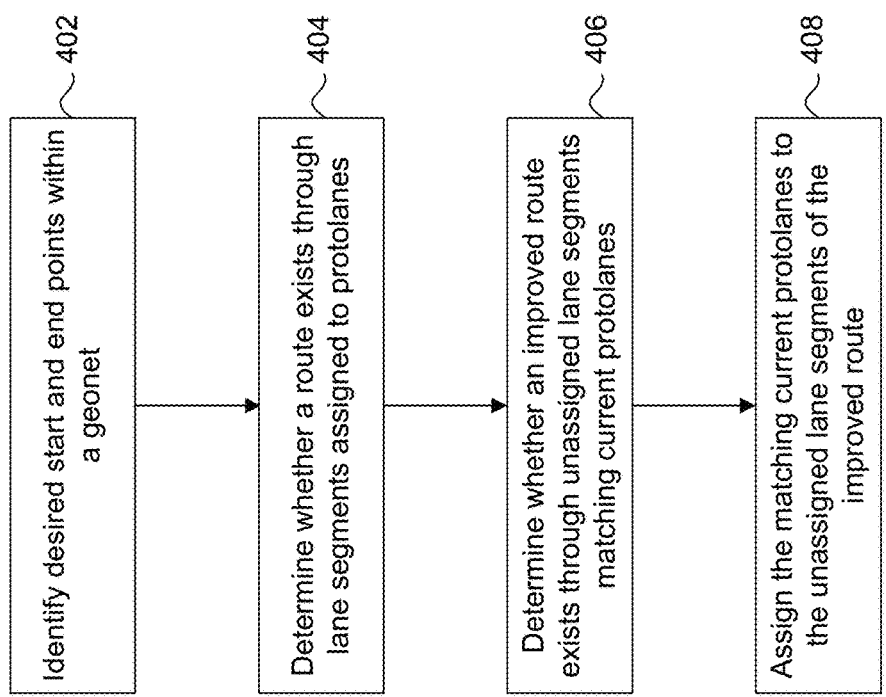
FIG. 4 is a flowchart illustrating steps for reducing the test space using route information, in accordance with aspects of the disclosure.

FIG. 4 is a flowchart 400 illustrating steps for reducing the test space using route information, in accordance with aspects of the disclosure. At step 402, start and end points of a desired route are identified, and at step 404 it is determined whether a route exists through lane segments assigned to protolanes. If such a route exists, then it is used as the baseline route between those points. At step 406, it is determined whether a route is possible (including any sufficient route, in cases where no route using lane segments assigned to protolanes exists) through any unassigned lane segments that match current protolanes. And, on the basis of this route, current protolanes can be assigned to the unassigned lane segments that are part of that route and thereby expand the geonet, in order to improve routing functionality through an equivalently limited test space.

Here, through the application of flowchart 400 and similar approaches, it is possible to grow the usable portions of the geonet without expanding the test space. If the overall number of protolanes remains constant, then the improved route will already be tested and verified by virtue of the underlying protolanes having been tested and verified. One skilled in the relevant arts will appreciate that lane new areas in the geonet may require new testing with respect to other dimensions of variation. As an extreme, and non-limiting, example, an unprotected left turn may not be mapped to a protolane, but if a right turn is, it may be beneficial to complete the route by performing three right turns around a block using the existing right turn protolane, rather than adding a protolane for the unprotected left turn and incurring all of the testing and verification costs associated with that.

Reducing the test space in this way results in significant benefits when extending the operation of the AV to additional roadways. For example, when constructing an entirely new geonet, or when updating a map for a geonet, it is possible to simplify the number of lane segments into a handful of protolanes that can be used for test and verification.

The lane segments that can be made navigable by matching them with protolanes, having been tested and verified at the protolane level, can be expanded by restricting the additional lane segments to current protolanes, as in step 406 of FIG. 4. But selection of additional lane segments for inclusion in navigable areas can also be based on minimizing an overall number of protolanes, by selecting lane segments for matching based on an amount of time spent in each lane segment, or by selecting protolanes with more readily achievable testing and verification requirements, by way of non-limiting example. One skilled in the relevant art will appreciate that other criteria may be selected for determining which lane segments of a geonet should be made navigable.

This approach can also be used to rapidly expand tested and verified AV navigation into additional geonets. If the AV has been tested and verified within a particular geonet having a corresponding set of protolanes, an analogy can be made to any other geonet that shares the same or a subset of the protolanes. By this approach, it is possible to provide evidence of satisfying testing and verification requirements (e.g., regulatory requirements in a different jurisdiction corresponding to the additional geonets) without resorting to time-consuming additional testing and verification.

Additionally, if there are two geonets that are nearby, an effort can be made to isolate a route between those geonets that requires defining a minimal set of protolanes to verify correctness of operation of the lane segments on the route. By connecting these two larger geonets while favoring the addition of minimal numbers of protolanes to complete the route, it is possible to significantly expand the overall geonet with minimal additional testing and verification.

Figure 5A:
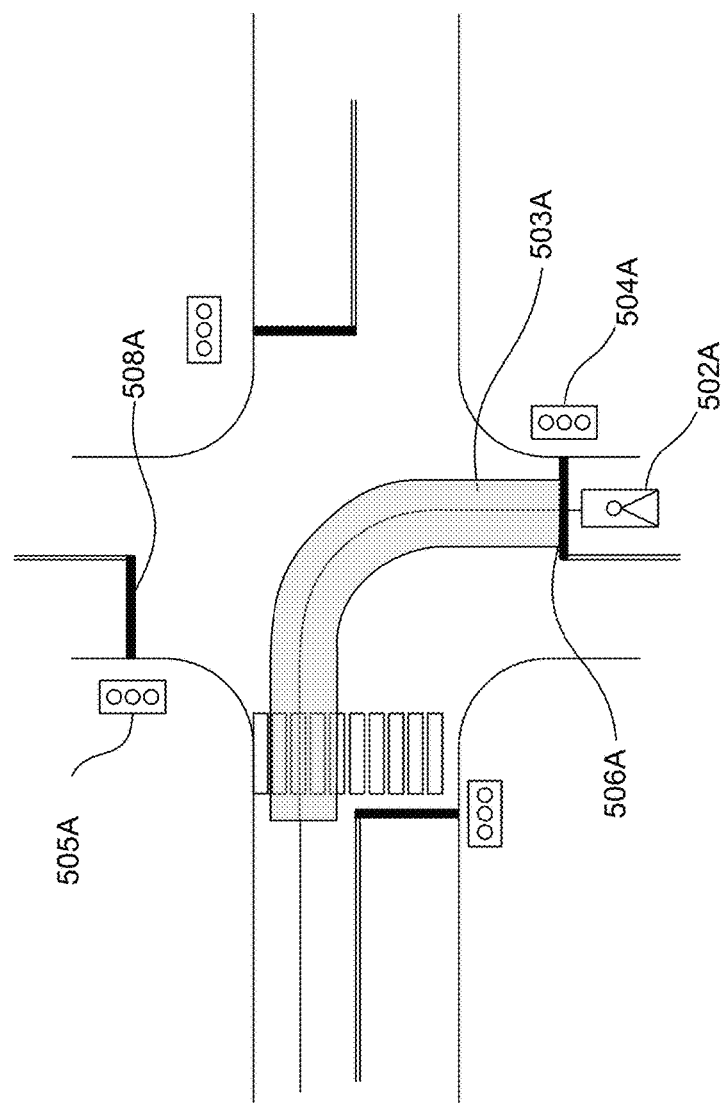
FIGS. 5A and 5B depict an exemplary set of protolanes, in accordance with aspects of the disclosure.
Figure 5B:
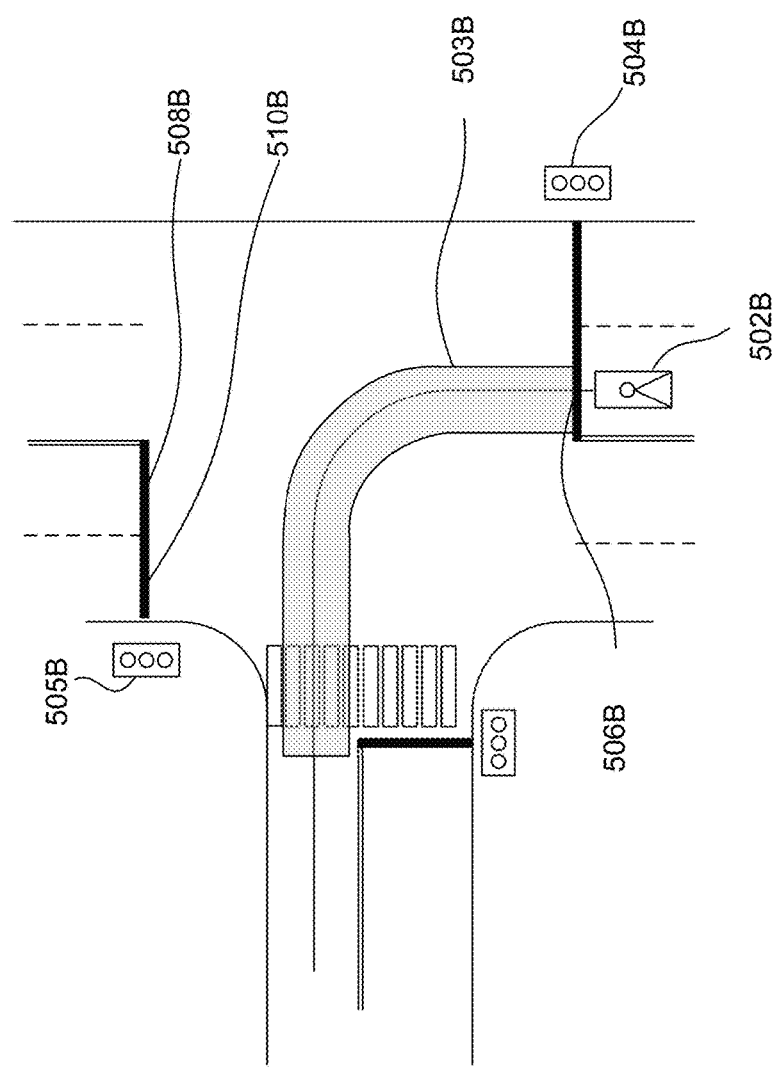

FIG. 5A and 5B depict an exemplary set of roadway situations, namely intersections 500A and 500B, in accordance with aspects of the disclosure. Intersection 500A of FIG. 5A is illustrated as a 4-way traffic light-controlled intersection with an unprotected left turn. Intersection 500B of FIG. 5B is illustrated as a 3-way traffic light-controlled intersection with an unprotected left turn across two lanes of traffic.

A test developer would prepare a set of tests for each of the circumstances that may occur at this intersection in order to validate operation of AV 502A/502B in the particular roadway situation. However, these two intersections 500A and 500B have many similarities, and would be expected to share a common subset of test cases. Through the definition of lane segments, and corresponding protolanes, for these intersections, a test developer can reuse tests across multiple roadway situations.

For example, in the case where the controlling traffic light 504A and 504B provides a left turn signal to AV 502A and 502B in both scenarios, oncoming traffic in lane 508A of intersection 500A as well as lanes 508B and 510B of intersection 500B is expected to stop (opposing traffic lights 505A and 505B will be red). Under these conditions, both AV 502A and 502B could clear their respective unprotected left turns in the same way by following path 506A across a single lane 508A of intersection 500A, or path 506B across the two lanes 508B and 510B of intersection 500B.

However, if an oncoming vehicle is stopped for red light 505B at lane 508B in intersection 500B, AV 502B may not have sufficient visibility to lane 510B to ensure that any approaching vehicle in that lane will successfully stop before intruding into path 506B.

As shown in FIGS. 5A and 5B, lane segments 503A and 503B are defined that correspond to a particular path for AVs 502A and 502B respectively. For lane segments 503A and 503B, some set of conditions that can be tested by the same set of tests are present (e.g., a left turn with clear visibility), and some tests may be unique to certain sets of conditions for a lane segment (e.g., a left turn with partial visibility across two oncoming lanes).

The granularity with which to map lane segments to protolanes is considered as part of the construction of the protolanes. A geonet may have a quantity of lane segments numbering upwards of 100,000. But if a unique protolane were assigned to each of those lane segments, this would not be a practical abstraction. Testers would need to design tests for each individual lane segment, and verify the reliable operation of the AV across all of those 100,000+ lane segments. Designing such a large number of test scenarios may be impractical or inefficient in practice.

At the other end, a low number of protolanes to cover all possible lane segments (e.g., 10 protolanes) may be insufficient to properly address all of the unique circumstances that can arise in a given one of those protolanes. In a typical case of a geonet with several hundred thousand lane segments mapped, a few thousand protolanes can be sufficient to strike the right balance. One skilled in the relevant arts will appreciate that there is no definite correct number of protolanes, and any selection balances efficiency against confidence in the correctness of the AV's performance. However, once confidence in the performance of the AV approaches a certain threshold, diminishing returns can make additional focus on those metrics economically untenable.

In accordance with an aspect of the disclosure, protolanes can be constructed based on a combination of features, including hard features and soft features. Hard features, in this context, are binary and exclusionary features. For example, a hard feature may be the presence or absence of a crosswalk within a lane segment. In this determination, a lane segment that intersects a crosswalk may be prevented from being mapped to the same protolane as a lane that does not intersect a crosswalk. Another exemplary hard feature may be whether an intersection is or is not governed by a stop sign. Skilled developers of AV systems will recognize additional hard features that, for completeness of testing and verification, should likely have their binary options mapped to separate protolanes.

In an aspect of the disclosure, hard features are pre-prescribed, and a typical set of hard features may include upwards of several dozen features. In one aspect, 31 separate hard features may be pre-prescribed, which would set an upper bound for a vocabulary including a maximum allowable total of $2^{31}$ protolanes. As a practical matter, these features do not all appear in combination with one another, and so the actual number of combinations of hard features is typically much lower.

Separate, and in addition to these hard features, a set of soft features can be defined, in accordance with aspects of the disclosure. These are features that have real value measurements, as opposed to binary options as with the hard features. For example, soft features may include lane width, bank, grade, curvature, etc. that can provide further clustering and decomposition of the lane segments.

In contrast to the hard features, soft features follow a non-exclusionary principle. For example, a first lane and a slightly wider second lane can typically both be mapped to the same protolane, as this difference is unlikely to impact testing and verification. In order to determine appropriate ranges of differences for these soft features that can reasonably be mapped to a same protolane, lane segments (for a given hard feature, in an aspect) can be clustered across N-dimensional space, where each dimension corresponds to an individual soft feature. The resulting clusters can be grouped based on a desired maximum number of resulting protolanes, for example, with a single protolane mapped to all of the lane segments within a corresponding cluster.

Additionally, consideration may be given to static and dynamic features to construct a protolane, in accordance with aspects of the disclosure. As the naming indicates, static features remain unchanged, while dynamic features may change depending on other conditions. Whether a lane segment has a crosswalk, for example, is a static feature (that also happens to be a hard feature—there either is a crosswalk or there isn't). The particular lane width for the lane segment may also be a static feature (that in this case also happens to be a soft feature—there are a range of possible lane widths, but the width will not change for the life of the lane). Dynamic features (e.g., the presence of construction, road obstructions, etc.), in contrast, can affect the behavior of actors even when a lane segment is physically identical. For example, the location of a lane segment within a geonet might indicate different types of traffic are likely to be present (e.g., in an industrial setting vs. in the middle of a city), and can be used to further segment protolanes to ensure appropriate test coverage.

With a given set of lane segments (e.g., a full geonet) each assigned to a corresponding protolane, it is possible to make probabilistic assessments across the set of lane segments. For example, it is possible to determine a probability of the AV driving through a particular protolane during a given trip, or by assessing fleet-level data of frequencies of AVs traversing protolanes within a given geonet.

With this information, it is possible to engage in more complex querying of the set of lane segments. For example, if a tester wants to determine how many negative events the AV is expected to encounter in a deployment geonet, the question can be answered by marginalizing data regarding how many negative events are expected within a given protolane across the expected or observed occurrence of that protolane while the AV is driving. This information can be used, for example, to route the AV across a certain set of lane segments corresponding to certain protolanes that reduce the expectation of negative events.

When preparing tests and validating the operation of the AV over lane segments in a geonet, these assessments may be useful in prioritizing the efforts of the test designers. For example, if a certain area of a geonet has actual or expected higher usage by the AV, then the protolanes within that certain area of the geonet can be singled out for priority handling. This allows for increased certainty of reliable operation in areas of the geonet that would benefit the most from prompt review of the test and validation results.

With the concept of protolanes defined, it becomes possible to describe the individual interactions that an AV may encounter with various actors (e.g., other vehicles, pedestrians, etc.) on a protolane-specific level.

Figure 6:
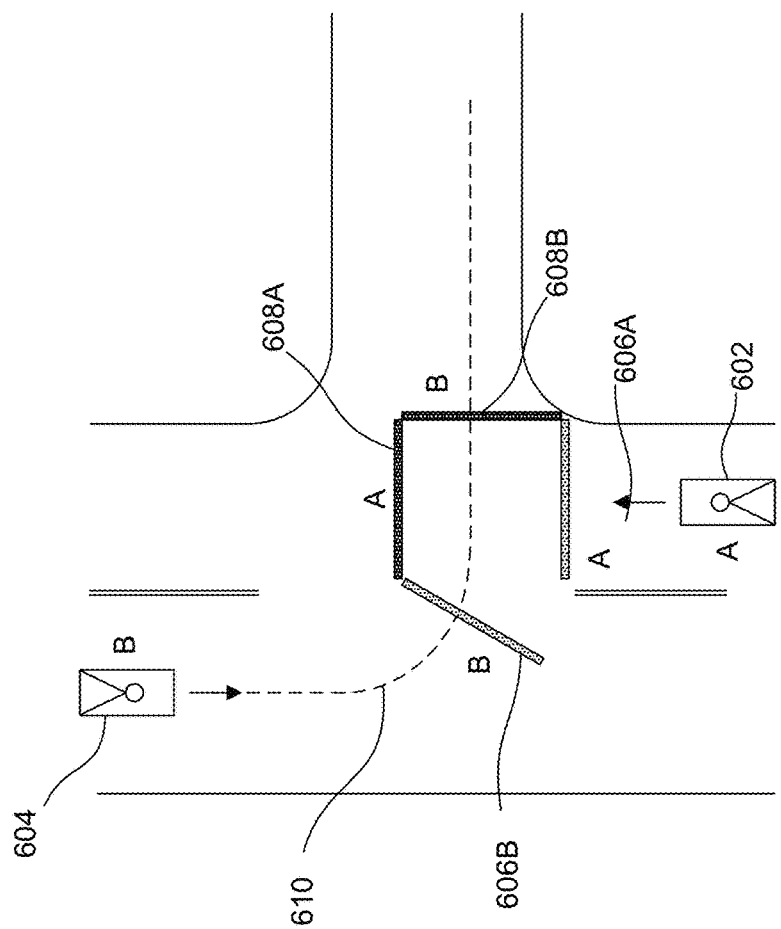
FIG. 6 illustrates an exemplary interaction, in accordance with aspects of the disclosure.

FIG. 6 illustrates an exemplary interaction 600, in accordance with aspects of the disclosure. Interaction 600 depicts two vehicles, vehicle 602 and vehicle 604, entering an intersection. From the perspective of vehicle 602, this intersection involves the possibility that an oncoming vehicle (e.g., vehicle 604) may make an unprotected left turn (e.g., along path 610) in front of the vehicle 602. In the context of interaction 600, vehicle 602 and vehicle 604 are both actors.

Actors have attributes associated with them, in accordance with aspects of the disclosure. For example, vehicle 602 may be associated with attributes such as direction of travel (course), heading, speed, whether the vehicle is parked, etc. These attributes can be used to determine goals for each of the actors.

Goals determine where an actor is trying to go. In accordance with aspects of the disclosure, goals may be defined by a position and orientation that the actor is trying to reach. Goals do not need to explain how an actor will do something, or why they are doing it, but simply identify the desired end result—these are the intentions of the actor now, not at a future time.

Goals may be based on types of actors. For example, a pedestrian may intend to reach the far side of a crosswalk, where the goal would be the midpoint on the far side of the crosswalk and oriented to show the pedestrian continuing onwards. Similarly, a vehicle may have a goal to exit a drivable area via an unmapped driveway.

As will be described in further detail here, goals can also be understood in the context of specific protolanes, in accordance with aspects of the disclosure. For example, a pedestrian could not have a goal of reaching the far side of a crosswalk in a protolane that does not have a crosswalk. In the case of interaction 600 for example, vehicle 602 could not reasonably have a goal of making a left turn, because there is no roadway to the left.

By predicting/estimating/forecasting/using the goals of a given actor, as restricted by protolanes, it is possible to describe a distribution of possible behaviors that the actor can execute in furtherance of their expected goals. Actors, based on the type of object they correspond to (e.g., a vehicle, a pedestrian, etc.), typically attempt to reach a specific goal through a certain behavior. Therefore, the actor type plus the goal is needed to forecast behaviors—a goal alone cannot do that, as both a jaywalking pedestrian and a turning vehicle may have a goal of entering the middle of an intersection, but exhibit different behaviors particular to their object type in reaching this goal. For a given actor and a given goal for that actor, multiple forecasts may be generated.

When goals are discussed in the context of actions by an AV actor, the goals may be referred to as intents. When 'goals' or 'intents' are discussed throughout this disclosure, these terms are used interchangeably, although 'intents' are typically used in the context of the AV and 'goals' more generally for other actors. Similarly, 'forecasts' are the expected behaviors for other actors, while a 'trajectory' refers to the behavior that an AV will follow to reach a goal.

Interaction 600 further includes gates 606A, 608A, 606B, and 608B, in accordance with an aspect of the disclosure. Gates are regions where decisions need to be made with respect to other actors, while carrying out behavior in furtherance of a goal. The gates delineate a contested space between a pair of interacting actors, such as vehicle 602 and vehicle 604 in interaction 600. The contested space is the area encompassing the interaction when interacting trajectories or forecasts are sufficiently close in a spatiotemporal sense. In the case of interaction 600, gates 606A, 608A, 606B, and 608B bound the area in an intersection where vehicle 602 and vehicle 604 will both need to be present at different times over the course of interaction 600.

In accordance with aspects of the disclosure, gates may be deployed in entry/exit pairs, such as entry gate 606A and exit gate 608A, or such as entry gate 606B and exit gate 608B. Gates are depicted as orthogonal to an actor's direction of travel (or lane boundary). In accordance with additional aspects, gates are treated individually rather than paired, and a sequence of gates is defined for a particular interaction—for example, when vehicle 602 approaches entry gate 606A, the behavior at entry gate 606A can be considered in view of a number of conditions, including whether exit gate 608A is open—and the open/closed state of each gate is handled individually.

Entrance gates have a dynamic binary state associated with them that is used to regulate the interaction, in accordance with aspects of the disclosure. Specifically, entrance gates are described as being open or closed to represent whether an actor has precedence to proceed into a contested space behind the entrance gate, or not. An actor making an unprotected maneuver, for instance, needs sufficient opportunity to complete the maneuver without impeding another actor that ultimately has the right of way.

The state of a gate can change dynamically depending on other factors in the interaction, such as traffic light state or proximity of other actors. Conceptually the pair of entrance gates (e.g., entrance gates 606A and 606B) that regulate the interaction (e.g., interaction 600) are mutually exclusive, such that only one actor (e.g., vehicle 602 or vehicle 604 can have precedence at any given time, in accordance with aspects of the disclosure.

It is entirely possible that both entrance gates are simultaneously closed. Traffic light controlled intersections often have several seconds of red lights in all directions while changing right of way. This delay allows traffic within the intersection to clear. During this time interval, no actor has precedence to enter the intersection.

The concept of gates are not used to restrict the behavior of an AV. Instead, gates are used to validate whether the AV performed a desired operation based on a desired criteria, in accordance with aspects of the disclosure. It is not sufficient to only validate that an AV engaged in a particular desired maneuver, but rather the entire reasoning for the AV's selection of the maneuver should also be evaluated.

A protolane has a sequence of zero or more fixed location gates along its path depending on a number of map conflicts. Gates represent a decision point for any actor: to proceed or not to proceed. Therefore, given a protolane, it is possible to determine a sequence of decisions that an actor (including the AV) performs to transit the length of the protolane, reaching its goal while also interacting with all other actors.

As previously noted, when testing and verifying the operation of the AV, it is not sufficient to know whether the AV carried out the desired operation, but whether the AV carried out the desired operation for the correct reasons (or that it carried out an undesired operation). This is useful as a way to pinpoint problems with the AV operation. For example, if the AV starts to make an unprotected left turn when it was not the desired operation, it is possible to isolate a perception problem (e.g., the AV didn't see the oncoming traffic) from a decision making problem—if the decisions have been fully tested and verified, we know the decisions are sound, so the problem is likely one of perception.

With the concept of a protolane in place, the amount of test logic that testers have to develop to fully validate the operation of an AV within a given geonet is thereby governed by the number of protolanes present in lane segments within that geonet. For example, any one unprotected left turn with a crosswalk has the same set of logic as any other unprotected left turn with a crosswalk in terms of navigating gates. So testers can develop tests at the protolane level to address a number of scenarios with each test.

In order to determine whether an AV properly executes its trajectory, testers can develop flowcharts for each protolane, in accordance with aspects of the disclosure, that outline all of the possible decision branches based on the gates. A tester can then construct scenarios that test every possible decision that an AV may make, either in the real world or in a simulation, for a given protolane by testing against these flowcharts.

Figure 7:
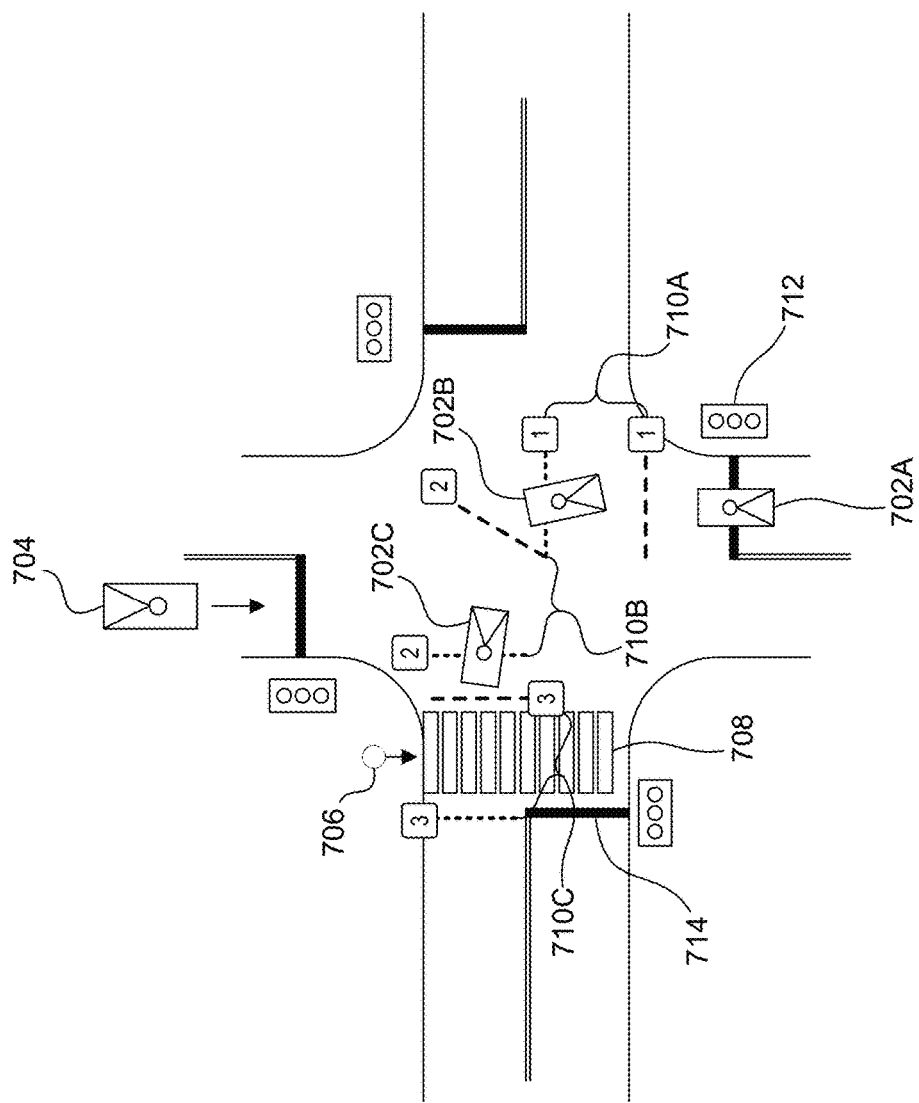
FIG. 7 illustrates an additional exemplary interaction, in accordance with aspects of the disclosure.

FIG. 7 illustrates an additional exemplary interaction 700, in accordance with aspects of the disclosure. Interaction 700 depicts a vehicle 702 transitioning through a turn in an intersection (vehicle 702 is depicted at various stages of this turn as 702A, 702B, and 702C). An oncoming vehicle 704 is present at the intersection. Vehicle 702's turn is governed by traffic light 712. And there is a crosswalk 708 present near the end of the trajectory of vehicle 702's turn, with a pedestrian 706 positioned to cross the intersection.

Interaction 700 includes gates 710, which are divided into three gate pairs: 710A, 710B, and 710C. These gate pairs control the entry of vehicle 702 into various areas of the intersection. For example, gate pairs 710A control vehicle 702's entry into the intersection based on the state of traffic light 712. Gate pairs 710B control vehicle 702's entry into the opposing lane of traffic, in the line of vehicle 704. And gate pairs 710C control vehicle 702's entry into crosswalk 708. As before, in accordance with aspects, the logic defining interaction 700 can be provided on a per-gate basis (e.g., as a sequence of gates) rather than at a gate pair level, and one skilled in the relevant art will recognize that discussion herein directed to gate pairs can be resolved using individual gate logic for a sequence of gates.

The conditions for navigating each of these gate pairs can be outlined in the following exemplary manner:

Gate 1: Committing to the Intersection

Proceed through the entrance gate of gate pair 710A if the following conditions are all true:
- A: Traffic light 712 displays a green circle.
- B: There are no non-compliant actors in the cross-traffic lane 714 from left.
- C: There is at least one car length of free space available beyond the exit gate of gate pair 710C.

Stop otherwise.

Gate 2: Committing to Crossing the Oncoming Traffic Flow

Option 1: Proceed through the entrance gate of gate pair 710B if the following conditions are all true:
- A: Traffic light 712 displays a green or yellow circle.
- C: There is at least one car length of free space available beyond the exit gate of gate pair 710C.
- D: There is sufficient time to transit the oncoming lane (e.g. the AV's rear bumper passes beyond the exit gate of gate pair 710B) before an oncoming vehicle (e.g., vehicle 704) reaches the gated area. This requirement is satisfied if oncoming actors are far away, or if the oncoming actors show a clear intention to stop.
- E: There is no vulnerable road user ("VRU") (e.g., a pedestrian) within the crosswalk, or there is no unambiguous intention of a pedestrian to enter the crosswalk.

Option 2: Proceed through the entrance gate of gate pair 710B if the following conditions are all true:
- F: Traffic light 712 displays a red circle
- D: There is sufficient time to transit the oncoming lane (e.g. the AV's rear bumper passes beyond the exit gate of gate pair 710B) before an oncoming vehicle (e.g., vehicle 704) reaches the gated area. This requirement is satisfied if oncoming actors are far away, or if the oncoming actors show a clear intention to stop.

Stop otherwise.

Gate 3: Committing to Crossing the Crosswalk and Exiting the Intersection

Proceed through the entrance gate of gate pair 710C if following conditions are all true:
- C: There is at least one car length of free space available beyond the exit gate of gate pair 710C.
- E: There is no VRU (e.g., a pedestrian) within the crosswalk, or there is no unambiguous intention of a pedestrian to enter the crosswalk Stop otherwise.

Figure 8:
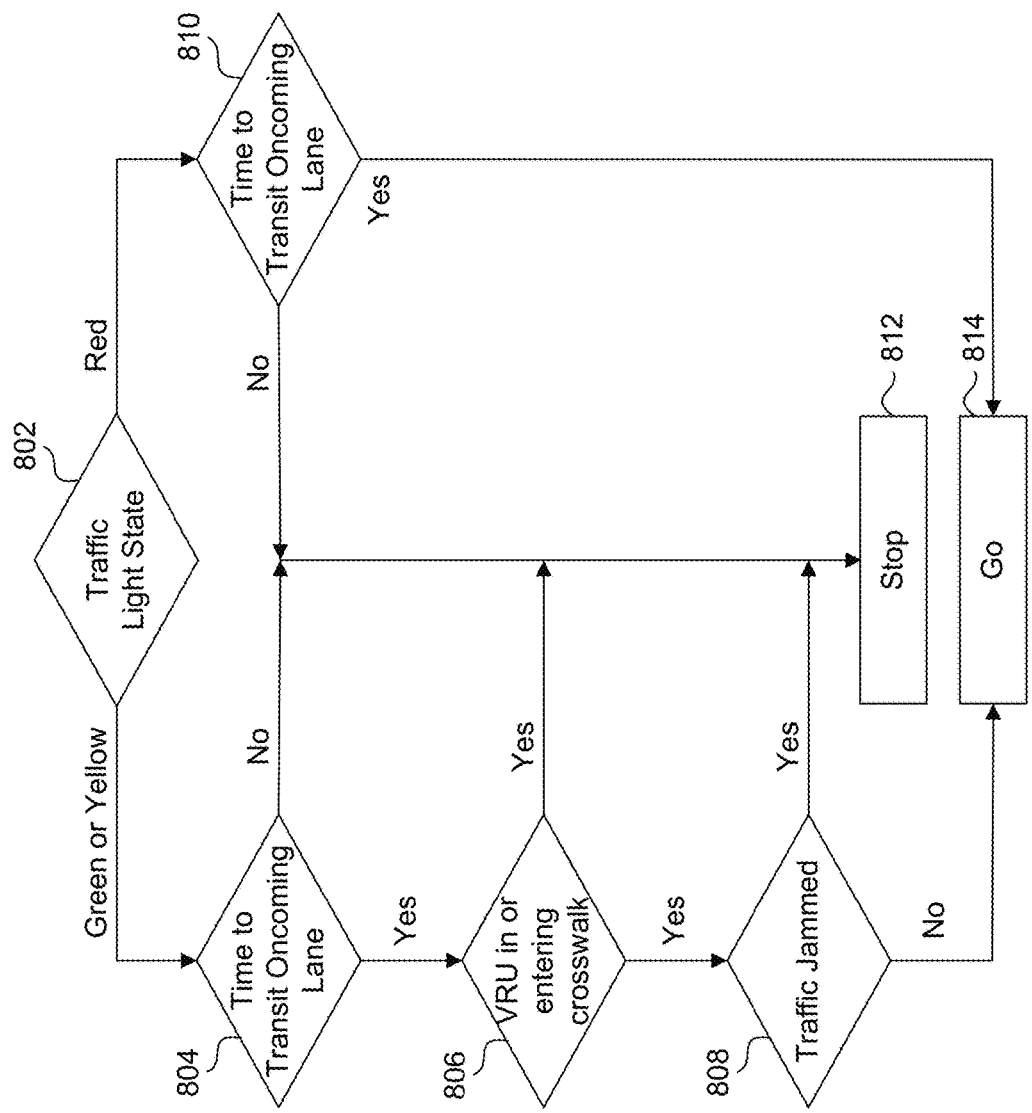
FIG. 8 illustrates an exemplary flowchart linking together gates, in accordance with aspects of the disclosure.

FIG. 8 illustrates an exemplary flowchart 800 linking together gates, in accordance with aspects of the disclosure. Flowchart 800 tracks the conditions described above with respect to Gate 2 (i.e., gate pair 710B of FIG. 7). At step 802, a determination is made of the state of the traffic light (e.g., traffic light 712 of FIG. 7). If the traffic light is red, it is determined whether there is sufficient time to transit the oncoming lane (e.g. the AV's rear bumper passes beyond the exit gate of gate pair 710B of FIG. 7) at step 810. If yes, then the test proceeds to step 814. If not, then the AV stops (and waits) at step 812.

If the traffic light (e.g., traffic light 712 of FIG. 7) displays green or yellow, then flowchart 800 proceeds to step 804, where it is determined whether there is sufficient time to transit the oncoming lane (e.g. the AV's rear bumper passes beyond the exit gate of gate pair 710C of FIG. 7) before an oncoming vehicle (e.g., vehicle 704 of FIG. 7) reaches the gated area. This requirement is satisfied if oncoming actors are far away, or if oncoming actors show a clear intention to stop. If the AV cannot make it across the oncoming lane in step 804, then the AV stops (and waits) at step 812. If yes, then the test proceeds to step 806.

At step 806, it is determined whether a VRU is present within the crosswalk, or if there is an intention that the VRU will enter the crosswalk. If yes, then the AV stops (and waits) at step 812. If no, then the test proceeds to step 808.

At step 808, it is determined whether traffic is jammed such that there is not at least one car length of free space available beyond the exit gate of gate pair 710C of FIG. 7. If yes, then the AV stops (and waits) at step 812. If no, then the AV proceeds at step 814.

The decision at each entrance gate can be contingent on a host of conditions, in accordance with aspects of the disclosure. These conditions can include, by way of example and not limitation:
- State of traffic flow control devices (a stop sign can be resolved similar to a traffic light based on arrival order).
- Whether there is adequate free space in a particular area—directly in front of the AV, but may also include more distant areas as well. Additionally, the spaces may be free immediately or have a strong expectation to be free at the appropriate time in the future.
- Hypothesizing an actor that may or may not exist, and if it does exist, whether that actor is proceeding through its own entrance gate or not. If the actor is proceeding, the behavior can be encoded as compliant or non-compliant.

Figure 10:
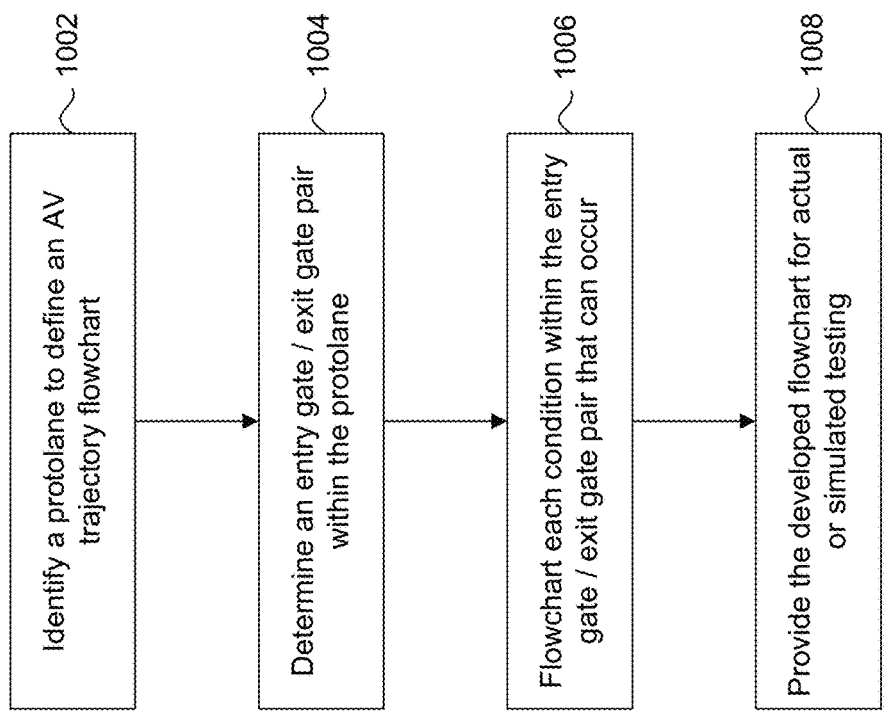
FIG. 10 is a flowchart illustrating a testing process using flowcharts for protolanes, in accordance with aspects of the disclosure.

FIG. 10 is a flowchart 1000 illustrating a testing process using flowcharts for protolanes, in accordance with aspects of the disclosure. The process begins at step 1002 where a protolane is identified for which one or more flowcharts will be built, in accordance with aspects of the disclosure.

At step 1004, an entry gate/exit gate pair within the protolane is identified for which a flowchart will be built. At step 1006, each condition that occurs while the AV traverses the entry gate/exit gate pair is considered and included in the flowchart. Then, at step 1008, the completed flowchart is provided for testing (actual or simulated).

In accordance with aspects, and as discussed above with respect to FIGS. 6 and 7, a flowchart for testing can be built on a per gate level rather than on a gate pair level. If gates are treated on an individual basis rather than as a pair, a flowchart can be developed to consider conditions for that individual gate, and additional such flowcharts built for each individual gate. Per-gate flowcharts may include conditions that depend on states of other gates (e.g., an entrance gate may toggle its open/closed state once the AV or another actor passes through another gate).

With flowcharts prepared for each gate pair or individual gate, a test team can then test every gate pair or individual gate within a protolane to validate the operation of the protolane. These tests against the possible conditions that occur within a protolane will then validate results across a large span of lane segments assigned to that protolane. For a given lane segment, the geometry of where entry gates and exit gates are located may be different given the geometry of features of the lane segment itself, but the same gates will be present across all lane segments of a common protolane and an AV will proceed through those gates in the same manner irrespective of the particular lane segment. Therefore, once these tests are successful, then the protolane can be confidently included in the available set of protolanes, and assigned to lane segments within a geonet.

With these flowcharts available, it is also possible to readily automate the construction of testing scenarios. One way to simplify automation of construction of testing scenarios is to reduce the number of individual flowcharts that require testing. While protolanes themselves group potentially large numbers of lane segments in a geonet together to various advantages, including common testing and validation, it is possible to further group the protolanes themselves for the purpose of testing. These protolane groupings, termed protolane families, include protolanes that all share the same overall flowchart representation (e.g., the family of left turns).

A distinction between individual protolanes in the protolane family is the complexity of the flowcharts. For example, in the case of an all way stop intersection with, and one without, crosswalks, these are represented by two different protolanes (likely according to hard features—the presence or absence of crosswalks). However, these two protolanes are closely related and can belong the same protolane family, just where one protolane happens to have crosswalk conflicts, and the other does not (resulting in different logic for transiting the region of the crosswalk). The protolane without crosswalks can still have people cross, but the pedestrian actors would be treated as non-compliant. The protolane with a crosswalk is only different in that the pedestrian behavior of crossing the protolane is compliant.

This comparison can be generalized by considering functional equivalents based on certain conditions. For example, a first protolane for an unprotected left turn with a traffic control signal is likely to be assigned as a separate protolane from a second protolane with a left turn without a traffic control signal from a main road onto a side street. This is so because the situations that arise in each of these protolanes can be vastly different. With the second protolane, there is no consideration for a traffic control signal since one is not present. And the AV has right of way turning onto the side road against vehicles entering the intersection from the side road. In the case of the first protolane, vehicles entering the intersection from the sides may have right of way based on the traffic control signal.

However, if it is assumed that the traffic control signal of the first protolane is showing green, then both scenarios are functionally equivalent for testing purposes. The AV in both cases needs to yield to oncoming traffic, but also has right of way against traffic from the sides. As a result, the same flowchart can be reused to build tests against both protolanes, in accordance with aspects of the disclosure.

Figure 9:
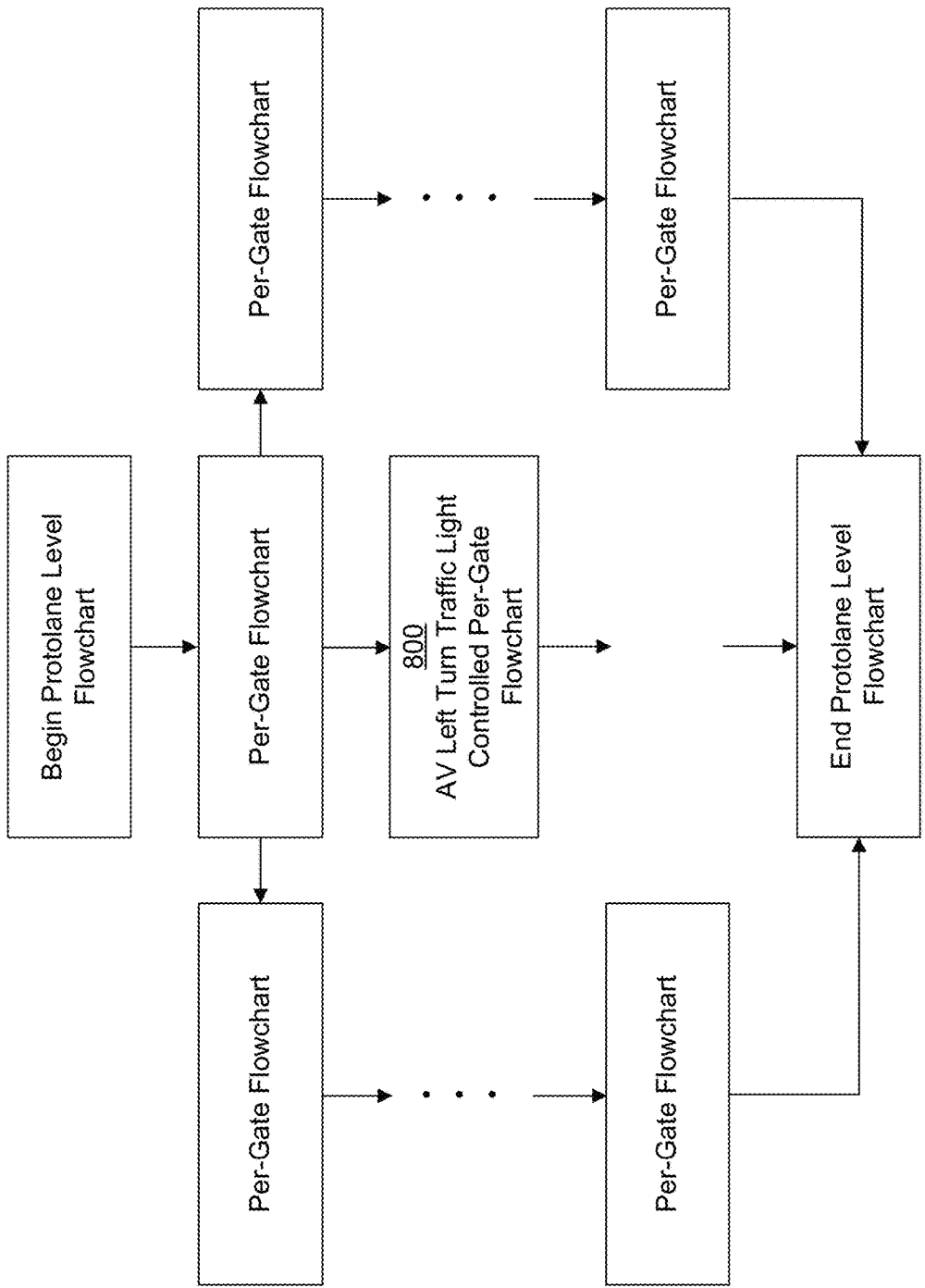
FIG. 9 illustrates an exemplary protolane level flowchart, in accordance with aspects of the disclosure.

These functional equivalents can be identified in an automated manner, in accordance with aspects of the disclosure. For every protolane, there is a flowchart for each gate or gate pair (depending on implementation) within that protolane. These individual per-gate or per-gate-pair flowcharts, such as flowchart 800 of FIG. 8, logically link together to form an overarching protolane level flowchart connecting the logic of the protolane's multiple gates or gate pairs together. FIG. 9 illustrates an exemplary protolane level flowchart 900, in accordance with aspects of the disclosure. As protolane level flowchart 900 illustrates, logical links between per-gate flowcharts (or per-gate-pair flowcharts), of which flowchart 800 of FIG. 8 is shown as one of the flowcharts.

A graph of the protolane level flowchart, or a subset thereof, can be compared to other protolane level flowchart graphs to identify subgraphs that are common. Then, any tests that refer to those subgraphs can be reused across the protolanes that have common subgraphs, and are treated as a protolane family. For example, based on the partial (gate level) flowchart 800 of FIG. 8 for a protolane with a traffic light, an otherwise identical protolane without a traffic light would have a similar gate level flowchart that reduces to steps 804, 806, and 808—a test corresponding to a subgraph of those three steps could then be reused in both protolanes.

Figure 11:
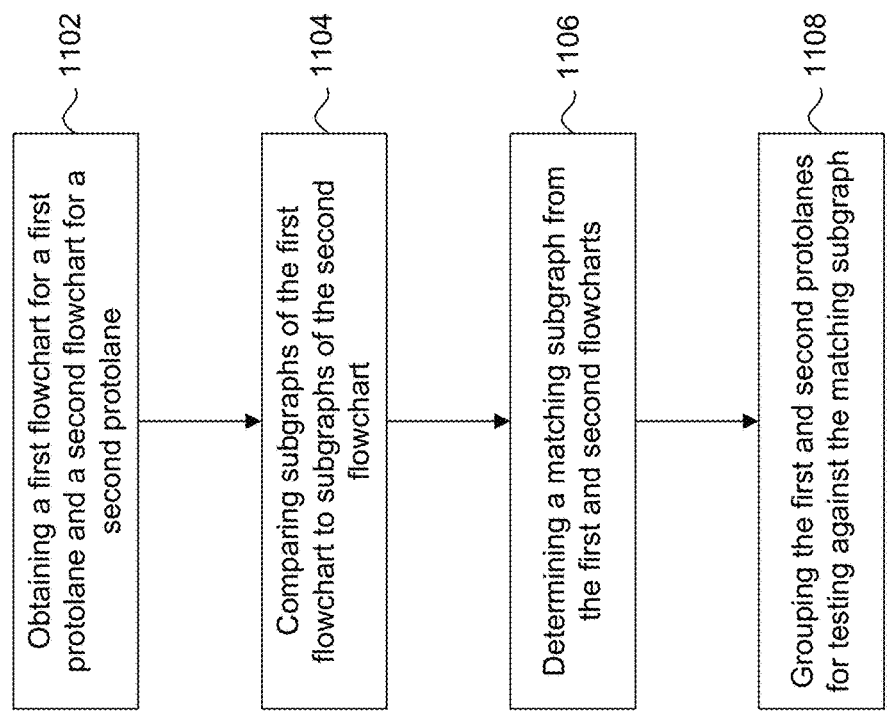
FIG. 11 is a flowchart illustrating steps for identifying functional equivalents of protolanes, in accordance with aspects of the disclosure.

FIG. 11 is a flowchart 1100 illustrating steps for identifying functional equivalents of protolanes, in accordance with aspects of the disclosure. At step 1102, corresponding first and second protolane level flowcharts are obtained for corresponding first and second protolanes. And at step 1104, subgraphs within each of the first and second flowcharts are compared. Any matching subgraphs are determined at step 1106, and if there is such a match, the first and second protolanes are then grouped for testing against that matching subgraph at step 1108.

This grouping aids in increasing the coverage of tests. Moreover, it can be used as a factor in deciding where to dedicate a limited testing budget to improve overall coverage. Once protolane families have been identified, a protolane family can be selected for testing based on, by way of non-limiting example, how many protolanes are in the protolane family, or which protolane family contains the highest-traffic protolanes. One way to determine overall coverage of test scenarios is to enumerate all of the logical combinations that can exist in a scenario. This can be done by determining all of the possible paths through a given flowchart, and counting how many paths exist. This quantity can then be compared to how many scenarios are covered overall by tests, to determine an overall coverage amount.

With this ability to produce tests that operate across a protolane family, these tests may be created with a base level of rigor—intended to at least test every condition within the flowchart at some level. However, these tests will typically include a number of factors that can be readily adjusted (e.g., an assumed duration of a red light), which an automated process can manipulate to instantiate multiple tests based on variations of the factors (e.g., a 30 second red light versus a 5 minute red light).

Various aspects can be implemented, for example, using one or more computer systems, such as computer system 1200 shown in FIG. 12. Computer system 1200 can be any computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary aspect, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 12. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A method, comprising:
   determining, by the one or more computing devices, a protolane level flowchart from one or more flowcharts corresponding to one or more gates of a protolane selected from a set of protolanes of a geonet, wherein the one or more flowcharts correspond to conditions that can be encountered by an actor approaching the corresponding one or more gates, and wherein the geonet comprises a plurality of lane segments associated with the set of protolanes;
   generating, by the one or more computing devices, a graph through the protolane level flowchart corresponding to actions of an actor; and
   validating, by the one or more computing devices, reasoning of the actor by testing the actions of the actor against the graph through the protolane level flowchart.

2. The method of claim 1, wherein the actor is an autonomous vehicle, the method further comprising:
   defining, by the one or more computing devices, a sequence of the one or more gates of the protolane based on a trajectory of the autonomous vehicle through the protolane.

3. The method of claim 1, wherein the one or more flowcharts corresponding to the one or more gates of the protolane are assigned to entry/exit gate pairs of the one or more gates.

4. The method of claim 1, further comprising:
constructing a test scenario for a subgraph of the graph through the protolane level flowchart.

5. The method of claim 1, wherein the one or more gates are each in a respective open or closed state.

6. The method of claim 5, wherein the closed state regulates entry by the actor into a contested space through a corresponding gate of the one or more gates.

7. The method of claim 1, wherein testing the actions of the actor against the graph includes validating whether the actor proceeded through a sequence of the one or more gates that are part of the graph consistent with the graph.

8. The method of claim 1, wherein the protolane selected from the set of protolanes comprises a sequence of consecutive protolanes.

9. The method of claim 1, wherein the protolane selected from the set of protolanes consists of a single protolane.

10. A system, comprising:
a memory; and
at least one processor coupled to the memory and configured to perform operations comprising:
determining a protolane level flowchart from one or more flowcharts corresponding to one or more gates of a protolane selected from a set of protolanes of a geonet, wherein the one or more flowcharts correspond to conditions that can be encountered by an actor approaching the corresponding one or more gates, and wherein the geonet comprises a plurality of lane segments associated with the set of protolanes,
generating a graph through the protolane level flowchart corresponding to actions of an actor, and
validating reasoning of the actor by testing the actions of the actor against the graph through the protolane level flowchart.

11. The system of claim 10, wherein the actor is an autonomous vehicle, the operations further comprising:
defining a sequence of the one or more gates of the protolane based on a trajectory of the autonomous vehicle through the protolane.

12. The system of claim 10, wherein the one or more flowcharts corresponding to the one or more gates of the protolane are assigned to entry/exit gate pairs of the one or more gates.

13. The system of claim 10, the operations further comprising:
constructing a test scenario for a subgraph of the graph through the protolane level flowchart.

14. The system of claim 10, wherein the one or more gates are each in a respective open or closed state.

15. The system of claim 14, wherein the closed state regulates entry by the actor into a contested space through a corresponding gate of the one or more gates.

16. The system of claim 10, wherein testing the actions of the actor against the graph includes validating whether the actor proceeded through a sequence of the one or more gates that are part of the graph consistent with the graph.

17. A non-transitory computer-readable medium having instructions stored thereon that, when executed by at least one computing device, cause the at least one computing device to perform operations comprising:
determining a protolane level flowchart from one or more flowcharts corresponding to one or more gates of a protolane selected from a set of protolanes of a geonet, wherein the one or more flowcharts correspond to conditions that can be encountered by an actor approaching the corresponding one or more gates, and wherein the geonet comprises a plurality of lane segments associated with the set of protolanes;
generating a graph through the protolane level flowchart corresponding to actions of an actor; and
validating reasoning of the actor by testing the actions of the actor against the graph through the protolane level flowchart.

18. The non-transitory computer-readable medium of claim 17, wherein the actor is an autonomous vehicle, the operations further comprising:
defining a sequence of the one or more gates of the protolane based on a trajectory of the autonomous vehicle through the protolane.

19. The non-transitory computer-readable medium of claim 17, the operations further comprising:
constructing a test scenario for a subgraph of the graph through the protolane level flowchart.

20. The non-transitory computer-readable medium of claim 17, wherein testing the actions of the actor against the graph includes validating whether the actor proceeded through a sequence of the one or more gates that are part of the graph consistent with the graph.

* * * * *